D. H. TIERNEY.
Lathe Gage.
No. 79,032.
Patented June 16, 1868.
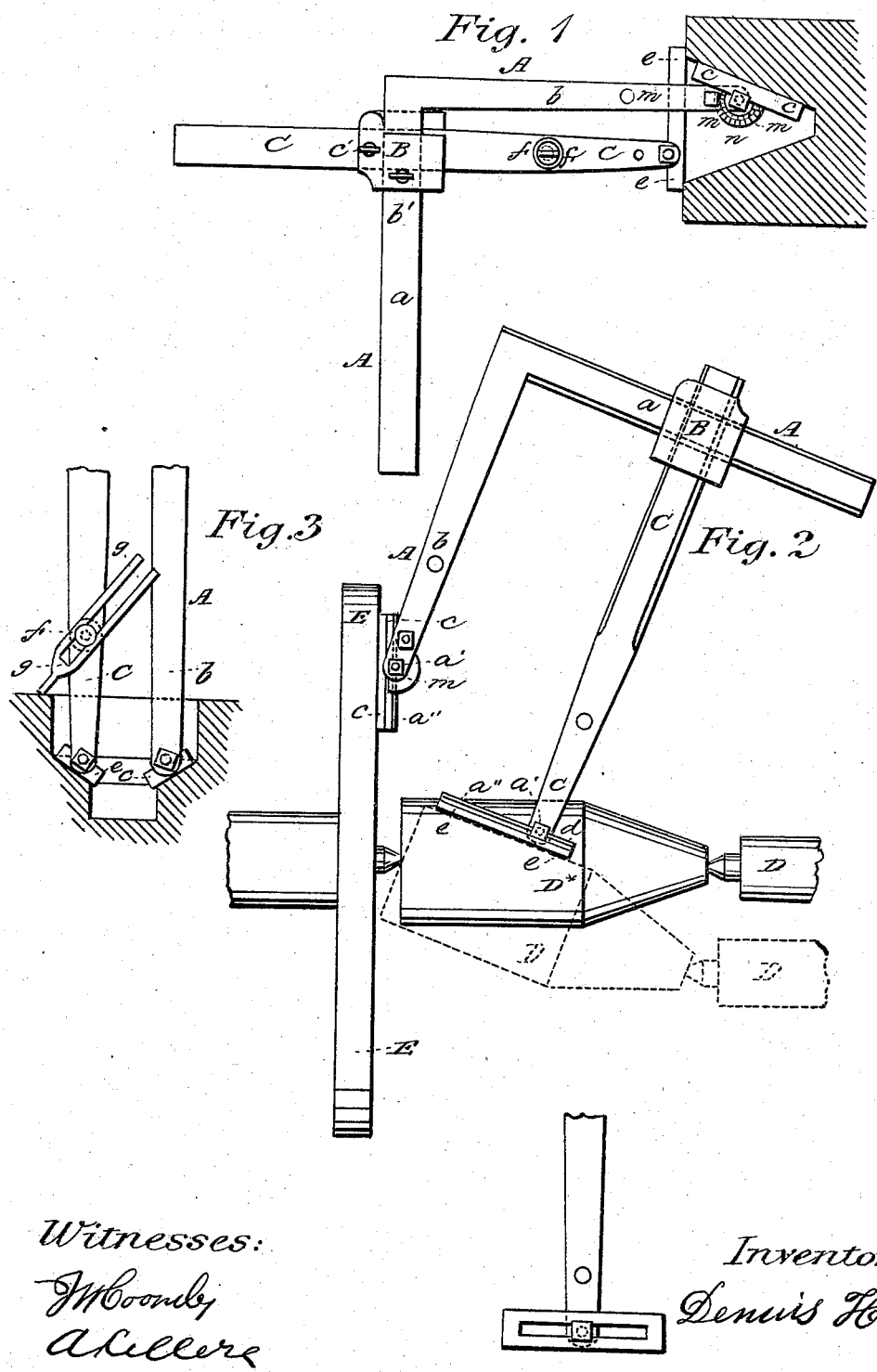

United States Patent Office.

DENNIS H. TIERNEY, OF NEW YORK, N. Y.

Letters Patent No. 79,032, dated June 16, 1868.

IMPROVEMENT IN BEVEL AND TAPERING-GAUGE.

*The Schedule referred to in these Letters Patent and making part of the same.*

TO ALL WHOM IT MAY CONCERN:

Be it known that I, DENNIS H. TIERNEY, of the city, county, and State of New York, have invented a new and improved Bevel and Tapering-Gauge; and I do hereby declare that the following is a full, clear, and exact description of the same, reference being had to the accompanying drawings, making a portion of this specification, in which—

Figure 1 is a side view of a gauge constructed according to my invention, showing the same as employed in gauging a conical recess.

Figure 2 is a side view of the same, as employed in gauging a conical or tapering piece or block.

Figure 3 is a detached side view of one portion of the same, showing the manner of using the gauge in gauging holes or recesses having straight or cylindrical sides and conical bottoms.

Similar letters of reference indicate corresponding parts in all the figures.

The object of this invention is to provide a gauge, by the use of which bodies of bevelled or tapering form, and holes or cavities of corresponding shape, may be turned and fitted with much greater accuracy than has hitherto been easily attainable.

The invention consists in an angular bar and a slide-bar, each furnished at one end with an adjustable blade, and so combined with each other, and with an adjustable slide fitted upon the angular bar, as to effectually secure the desired result.

The invention further consists in an adjustable arm, so combined with the sliding bar that in gauging cavities made bevelled only at one part thereof, the gauge may be readily adapted for application to such bevelled portion.

The invention further consists in certain novel means whereby the adjustable blade of either bar may be readily placed at any desired angle thereto, and whereby the longitudinal adjustability of such blade is very materially facilitated.

To enable others to understand the nature and construction of my invention, I will proceed to describe it with reference to the drawings.

A represents an angular bar, composed of two portions, $a$ and $b$, arranged at right angles to each other, as shown in figs. 1 and 2. At the extremity of the portion $b$ is a straight blade, $c$, secured to such extremity by means of a screw, $a'$, the head of which catches over one edge of the blade, in such manner that by slightly loosening the screw, the blade may not only be turned at any angle to the portion $b$ to which it is attached, but may also be moved longitudinally in either direction to any desired extent.

Provided upon the screw $a'$, between the blade $c$ and the adjacent portion of the bar A, is a semicircular plate, $m$, the plate being connected in any suitable way with the blade, so as to turn therewith, and having formed upon it, at its semicircular edge, a graduated scale, as represented in fig. 1, in such manner that when the screw is turned in adjusting the blade, the position of the scale with reference to one corner of a stud, $m'$, fixed to the bar in proper proximity to the plate $m$, will indicate the angle at which the blade is situated with reference to the bar, thereby greatly facilitating such adjustment of the blade. Instead of the stud $m'$, a simple line or indentation may be provided upon the bar A, to serve as the fixed pointer for the scale on the plate.

Placed upon the part $a$, of the angular bar A, is a slide, B, capable of being fixed at any point upon such portion, by a thumb or set-screw, $b'$, and having formed in it a transverse slot, through which is passed a straight side-bar, C, capable of being moved longitudinally through the slide, and made stationary with any desired point within the slide, by means of a suitable screw, $c'$. The innermost extremity of the bar C has a straight adjustable blade, $e$, secured thereon by a screw formed with a hooked head, $a'$, which catches over one edge of the blade, and fits into a groove, $a''$, formed longitudinally in the outer side of the blade, near the edge just mentioned, so that by slightly loosening the screw, the blade may be adjusted either longitudinally or turned upon the pivot to any required angle to the bar.

The bar C is furthermore provided with a broad-headed screw, $f$, situated at a short distance from the just-mentioned inner extremity of the bar, and which serves to secure thereto an adjustable forked or slotted arm, $g$, the purpose of which will hereinafter fully appear.

In order to turn a taper upon any suitable article or material, as, for instance, upon the end of a cylindrical metallic bar, the blades $c\ e$ are adjusted at an angle to each other corresponding to the degree of taper to be given to the article to be turned, and such article is then centred between the centres of the lathe, as indicated in red outline at D*, in fig. 2, which being done, the tail-stock, shown in red outline at D, is moved laterally, to bring the article into such position that when one of the blades is placed against the flat face of the face-plate, indicated in red color at E, the others will be in line with the straight sides of the article, as represented in fig. 2; so that the cutting-tool, moving at that side of the article opposite to that at which the gauge is situated, and moving in a direction parallel with the axis of the line-centre at $m$, cuts or "turns" the material to the required taper; so that the gauge being properly adjusted, articles more or less conical or tapering in form, may be turned with very great accuracy and convenience.

In order to use the gauge in shaping a conical cavity or recess, as, for instance, in the flat end of a metallic or other block, as indicated in red outline at $n$, in fig. 1, the bar C is brought at such distance from the portion $b$, of the angular bar A, that its blade $e$ may be turned at right angles across the portion $b$, just mentioned, the blade $c$ of the latter being furthermore adjusted at an angle thereto corresponding to the bevel or inclination designed to be given to the sides of the cavity, whereupon, the block having been properly secured upon the face-plate of the lathe, and receiving a rotary motion therefrom, the blade $c$ is thrust into the cavity with the transverse blade $e$ resting against the flat outer edge of the block, thus serving as a guide to enable the blade $c$ to be held in proper position within the cavity, the position of the outer edge of the blade $c$, with reference to the sides of the cavity, indicating the extent to which the shape of the cavity, at any stage of the turning operation, approximates to the tapering or conical form desired.

Should it be desired to shape a bevel within a cavity cylindrical at its inner and outer portions, as shown in the red outline in fig. 3, the blades $c\ e$ of the bar C, and portion $b$ of the angular bar A, respectively, are placed opposite each other, and inclined in opposite directions, as represented in the figure just mentioned, the two blades $c\ e$ being, in this case, as a general rule, shorter than when the gauge is used, as shown in figs. 1 and 2.

The forked or slotted arm $g$ is then attached to the bar C, with its inner end in such position and at such distance from the blades, that it will rest upon the end or surface of the block when the bevel has been shaped or formed to the required depth of the cavity, the position of the blades with reference to the bevelled surface indicating the degree to which such surface approaches the bevelled form desired.

What I claim as my invention, and desire to secure by Letters Patent, is—

1. The combination of the slide B, angular bar A, adjustable slide-bar C, and adjustable blades $c\ e$, all arranged substantially as and for the purpose specified.

2. In combination with the subject-matter of the foregoing clause, I claim the adjustable arm $g$, arranged substantially as and for the purpose specified.

3. The arrangement of the graduated scale-plate $m$, adjustable blade $c$, and bar A, substantially as and for the purpose specified.

DENNIS H. TIERNEY.

Witnesses:
J. W. COOMBS,
A. LE CLERC.